Figure 1:
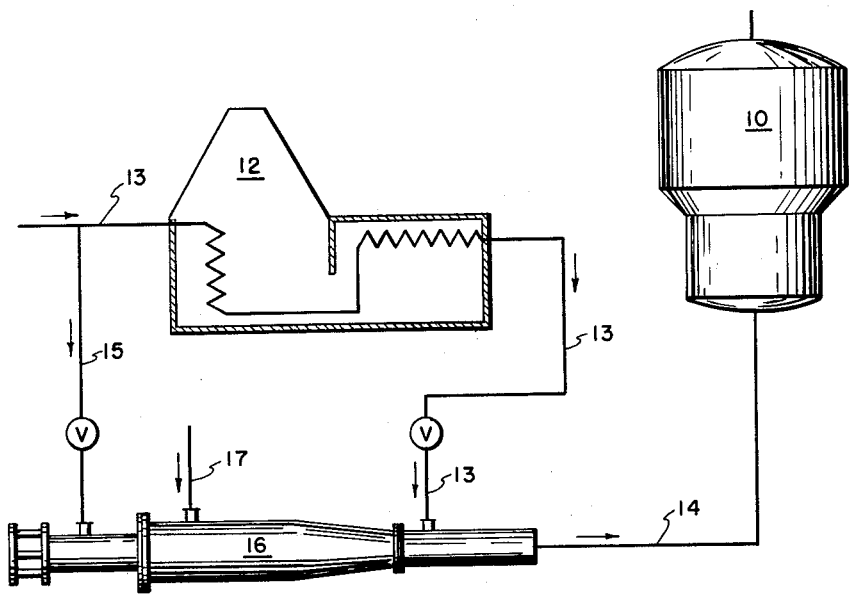

Oct. 27, 1964    P. C. DAVIS ETAL    3,154,103
MIXING APPARATUS FOR USE IN THE CHLORINATION OF ALKANES
Original Filed Oct. 8, 1958

United States Patent Office 3,154,103
Patented Oct. 27, 1964

3,154,103
MIXING APPARATUS FOR USE IN THE
CHLORINATION OF ALKANES
Philip C. Davis and Merle L. Gould, Baton Rouge, La., assignors to Ethyl Corporation, New York, N.Y., a corporation of Virginia
Original application Oct. 8, 1958, Ser. No. 766,127. Divided and this application Apr. 25, 1960, Ser. No. 30,041
2 Claims. (Cl. 137—625.4)

This invention relates to the manufacture of chlorinated alkanes and more particularly to a method and apparatus for mixing chlorine with gaseous alkanes for feeding into a thermal chlorination reaction zone. The present application is a division of application Serial No. 766,127 filed October 8, 1958, now abandoned.

Processes for chlorination of gaseous alkanes, such as methane, ethane and propane are well-known. The most practical of the processes are conducted in vapor phase at elevated temperature, above the initiation temperature for the reaction of chlorine and the alkane, e.g., above about 250° C. The principal problem in such processes is the formation of large amounts of carbon due to pyrolysis of the alkane, which carbon tends to plug the reactor or other process equipment and causes difficulty of the recovery of the desired chloro-alkane product.

Carbon formation is particularly acute in start-up operations. It is true that carbon formation can be eliminated by thoroughly premixing the chlorine with cold alkane and thereafter feeding this cold mixture to a preheated reactor maintained at a temperature above the initiation temperature of the gas, i.e., the temperature at which a mixture of the chlorine and alkane gas, or gases, will spontaneously react. However, this requires special and expensive heating equipment within the reactor, and equipment which is useful only for start-up operations since the heat of reaction of the chlorine and alkane is sufficient to maintain reaction temperature during normal operation. A preferred technique of preheating the reactor, and one which eliminates special reactor heating equipment, involves the use of superheated reactant gases. In this technique the alkane to be chlorinated is passed through the reactor until the temperature thereof is well above initiation temperature. However, the known methods are not capable of providing such preheating without prereaction of the chlorine and alkane or without excessive carbon formation. By prereaction is meant that the alkane and chlorine react before entering the reaction zone. For example, in fluidized bed reactors reaction occurs prior to, or before the gases enter the fluidized bed wherein reaction should take place. Specifically then, if the chlorine and alkane are premixed and thereafter superheated, prereaction takes place. Likewise, if the superheated alkane is mixed with the chlorine in the reactor very excessive quantities of carbon are formed because of reaction in zones of high chlorine concentration. These problems can be partially overcome by preheating the reactor, i.e., to a temperature above about 400° C., with hot alkane and thereafter feeding a cold mixture of chlorine and alkane to the hot reactor. Unfortunately, this method allows only a few minutes delay between the feeding of the hot gas and the starting of feeding of the cold chlorine-alkane mixture. Moreover, once the reactor temperature drops below the initiation temperature, it is necessary to preheat the reactor again. Thus, such a procedure is not practical for a large scale commercial operation.

Figure 2:
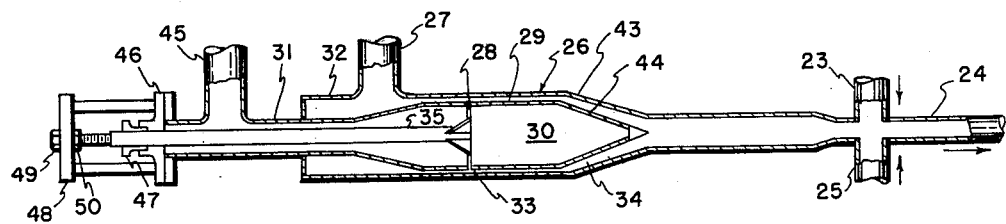

It is accordingly an object of this invention to provide an improved process for the chlorination of alkanes. Another object is to provide an improved method and apparatus for feeding a mixture of alkane and chlorine to a thermal chlorination reaction zone. Still another object is to provide an improved process for initiating a thermal chlorination of alkane reaction which minimizes or eliminates the formation of carbon due to pyrolysis of the alkane. Another object is to provide a process of the above type which can be employed in large scale commercial operation. It is also an object to provide a highly preferred type of mixing apparatus for carrying out the said process smoothly, efficiently and without excess carbon formation. It is yet another object to describe a modification of the apparatus which can be used for the chlorination of normaly gaseous olefin hydrocarbons. Other objects and advantages of this invention will be apparent from the following description made with reference to the attached drawings wherein:

FIGURE 1 represents a diagrammatic elevation view of a form of apparatus suitable for carrying out the process of the invention according to the preferred embodiment thereof, wherein a first portion of an alkane gas stream and chlorine are mixed in a special mixing nozzle, and the said alkane-chlorine mixture then further mixed with a heated alkane portion and the resulting mixture then fed into a chlorination reactor, and FIGURE 2 represents a highly preferred form of apparatus for mixing the chlorine and alkane gases. The said device provides for start-up as well as for a steady state operation.

The process is defined in terms of both a start-up operation and a steady state operation. Broadly the start-up operation is characterized by firstly providing in two separate streams a supply of normally gaseous alkane hydrocarbons which is to be chlorinated. The first stream of the alkane hydrocarbon gas is thoroughly mixed with the chlorine at a temperature below the initiation temperature. Thereafter the second stream of the alkane gas is heated and mixed with the resulting alkane-chlorine mixture and the total mixture of alkane and chlorine fed into the reactor. The initial temperature and relative flow rate of the second alkane gas stream just prior to said mixing however are sufficient to raise and to maintain the temperature of the total mixture above initiation temperature so that reaction begins when the second or hot alkane stream is introduced or mixed into the cold alkane-chlorine mixture.

Shortly after start-up and during the steady state operation, the temperature and relative flow rate of the hot alkane stream are reduced so that the sum total heat of the mixture is below initiation temperature. However, the mixture is at sufficiently elevated temperature so that when fed into the reaction zone the sum total heat, including the exothermic heat of reaction, will be equal to at least the initiation temperature within the reaction zone. For steady state operation, if the cold alkane stream and chlorine after being mixed are at sufficiently elevated temperature, so that when fed into the reaction zone the heat generated will rise to at least initiation temperature, then the hot alkane stream can be stopped completely.

The process of the invention will be fully understood from a more detailed elaboration hereinafter and from the following detailed description.

Referring to FIGURE 1, in starting up the reaction normally gaseous alkane hydrocarbon is first passed through the preheater 12, the valved line 13, the mixing nozzle 16, line 14 and through the reactor 10 at a temperature sufficient to raise the temperature of the reactor above the initiation temperature for the reaction, and preferably to a temperature of at least 50° C. above the initiation temperature. Thereafter, the quantity of this preheated alkane is gradually reduced, though above initiation temperature is maintained, and concurrently, chlorine and additional quantities of the alkane at a temperature below the initiation temperature, are also fed into the mixing nozzle 16 through line 17 and valved line 15 respectively and are therein intimately mixed. The merging streams, wherein reaction begins to occur, are fed into the reactor 10 through line 14. Thereafter the relative flow rates of the relatively cool mixture and the relatively hot alkane are readjusted, the flow rate of the cold alkane stream increased and the flow rate of the hot alkane stream reduced, so that reaction ceases within the mixing nozzle 16 and is confined to, and continues within, the reactor 10. Thereafter, during continued operation, the feed gases, including the chlorine and alkane streams, are continuously fed into the reactor 10. Preferably the merged streams have a mean temperature so that when reaction occurs enough heat is produced to maintain the desired reaction temperature, e.g., preferably 50° C. above initiation temperature, while obtaining essentially complete conversion of the feed chlorine.

In the most preferred process, the initial alkane-chlorine mixture, i.e., the relatively cool feed, is intimately mixed by feeding the chlorine through an annular mixing zone having a generally centrally restricted cross sectional area and simultaneously feeding the alkane into the same zone whereby the chlorine and alkane are subjected to only a slight pressure drop, of perhaps about 5 pounds per square inch. This mixture is thereafter mixed with the hot alkane stream, preferably prior to entering the reaction zone. During steady state operation the resultant gas mixture prior to entering the reaction zone will generally be below initiation temperature but will have a temperature such that with the heat of chlorination there will result the maintenance of a temperature within the reaction zone well above the initiation temperature required for the chlorination reaction.

The above process provides conditions for both continuous and start-up operation in which essentially no carbon is formed due to pyrolysis of the alkane. Thus, the reaction can be carried out over long periods of trouble-free operation with essentially no down-time for carbon cleanout and with maximum conversion of the reactants to the desired chloroalkane products. Likewise, no special heating or cooling equipment is required in the reaction zone proper, thus eliminating considerable plant investment and equipment which tends to collect solid carbon and accordingly to plug the reaction zone.

In general terms, the apparatus of the invention consists of a mixing nozzle or mixing section composed of two substantially coaxial tubular members, one of which terminates within the second or outer tubular member at an upstream position or a position which is slightly removed from the entrance to a frusto-conic opening formed by converging walls of the said second tubular member. Within the first or inner tubular member there is provided inlet and outlet means for the flow of a gas therethrough and into a restricted space enclosed by the second tubular member. The said gas outlet means is a peripheral slot opening formed by the open end of the first tubular member and the base portion of an adjustably adjoining throttling device which is coaxial with the said first tubular member. In addition, the base portion of the throttling device is substantially identical in cross section to the cross section of the opening formed by the open end of the said inner tubular member. Also, the throttling device provides a right conic section which extends into the frusto-conic opening provided by the second tubular member to form an annular frusto-conic opening. The second tubular member includes gas inlet and gas outlet means. Thus, gas inlet means are located upstream of the gas outlet means of the first tubular member, and the outlet means are through the annular frusto-conic opening heretofore described.

Referring to FIGURE 2 there is shown a feed gas mixing section 26 of a highly preferred type for rapidly mixing chlorine with normally gaseous alkane hydrocarbons. During start-up the reaction zone is heated to a steady state temperature by passage of a hot alkane feed stream through the cross nozzle portion of the mixing section 26 defined by lines 23, 24, 25 to the reaction zone. To initiate the reaction, a sufficient flow of ethane gas is then started through line 45. The ethane gas flows through the interior of the first tubular member 31 and out of the peripheral slot 28 into the second tubular member 32. The ethane gas then flows through the annular space 33 formed between the walls defining the second tubular member 32 and the cylindrical base portion 29 of the throttling device 30 and then into the annular-conical opening 34 formed between the conical shaped portion 44 of the throttling device 30 and the frusto-conic opening formed by the converging walls 43 of the second tubular member 32. The gas then flows through line 24 to the reaction zone. To initiate the reaction, flow of cold chlorine gas through line 27 into the second tubular member 32 is begun. The chlorine gas is then mixed with the cold alkane gas as it emits from the circumferential or peripheral slot 28. Complete mixing of the cold alkane and chlorine gases is achieved extremely rapidly. For example when the chlorine and cold ethane gases are introduced at the rate of 100 feet per second mixing is completed in about five milli-seconds. Usually then, complete mixing is achieved before the gases have moved even one inch through the annular mixing section 33. It is generally advantageous to keep this transverse distance as small as possible. This extremely fast mixing rate is one of the key and novel features of this invention. The mixed gases are then allowed to gradually expand in volume by flowing through the annular-conical mixing section 34, line 24, into the reaction zone. By gradual expansion of the volume of the gases large pressure drops are eliminated. After steady state conditions are reached, the flow of the hot alkane gas through line 23, 24, 25 is reduced and the flow of gases through lines 45, 27 increased. It is quite possible under some operating conditions, as stated heretofore, to completely stop the flow of hot alkane gas through lines 23, 25 after steady state conditions have been reached.

In addition to the features above described it will also be observed that a unique mechanical method is provided for closing or for varying the width of the peripheral slot opening 28. Thus, it is seen that the throttling device 30 is solely supported by the shaft 35 which passes through the open center of the tubular member 31, through the packing flange 46, packing gland 47, and to the backplate 48 to which it is threadably engaged. By simple adjustment of the nuts 49, 50, on each side of the backplate 48 the throttling device 30 is axially movable to or away from the open end of the tubular member 31. A preferred method of performing this operation is to crank the throttling device 30 in and out in similar fashion to the method of adjusting the jaws of a micrometer.

By some modification of the above apparatus 26 it is also quite possible to extend its use to processes wherein normally gaseous olefin hydrocarbons are to be chlorinated. In reactions of this type it is highly desirable that the mixed gases be fed into the reaction zone as rapidly as possible after complete mixing. For example, in mixing apparatus of the type defined above it is desirable that the reaction zone be brought as close to the annular mixing zone 33 as possible while yet allowing for the complete mixing of the chlorine and olefin hydrocarbon gases. Hence, if in the mixing apparatus 26 defined above all portions of the apparatus downstream of the portion defined by the annular space 33 be eliminated and the remaining portion of the apparatus be fitted immediately adjacent a chlorination zone normally gaseous olefin hydrocarbons can be successfully chlorinated. Repeating, for the sake of clarity, if the cross nozzle formed by lines 23, 24, 25 and the portion of the apparatus which forms the annular frusto-conic opening 34, i.e., the portion of the outer tubular member 32 downstream of the point wherein the walls 43 begin to converge and the right conical portion 44 of the throttling device 30, be completely eliminated then the device remaining forms an apparatus suitable for use as a mixing section for the chlorination of normally gaseous olefin hydrocarbons. Thus, the olefin hydrocarbon and chlorine gases are mixed within the annular mixing channel and then fed directly into a reaction zone.

The following example is given to illustrate the benefits of the invention but is not intended as a limitation thereof.

The preheat furnace 12 was started and a feed stream of ethane gas was brought up to a temperature of 900° F. The hot ethane stream was then continuously passed into the reactor 10 until the reactor temperature had reached 650° F. A second stream, a cold ethane stream, was then started and the hot and cold ethane streams were then adjusted to maintain a reactor temperature of 650° F. while also maintaining the total flow of the two streams at 8,700 pounds per hour. Chlorine gas was then gradually introduced and mixed with the cold ethane stream in apparatus of the type described in FIGURE 2. This mixture was then further mixed with the hot ethane stream. Reaction began to occur within the merging streams and within the cross section of the mixing nozzle 26. This reacting mixture was fed into the reactor 10 until the reactor temperature reached 750° F. The ethane flow through the preheater furnace 12 was then gradually reduced, but while still maintaining the total ethane flow at 8,700 pounds per hour, until the reactor temperature was again 650° F. The flow of chlorine into the mixing section was further increased and mixed with the ethane streams, as described, and the total mixture fed into the reactor 10 until the reactor temperature again reached 750° F. Again the flow of ethane through the preheater furnace 12 was reduced, while maintaining the total ethane flow constant, until the temperature has decreased to 650° F. Reaction within the cross section of the mixing section ceased to occur, though it continued within the reactor 10. These steps were repeated until all of the ethane was going directly into the reactor 10, and bypassing the preheater furnace 12.

From the foregoing it is apparent that the above process and apparatus are subject to some modification without departing from the spirit and scope of the invention.

As stated heretofore, by initiation temperature is meant that temperature at which reaction of the chlorine and alkane will spontaneously react. This temperature varies somewhat depending upon the particular alkane being chlorinated, the chlorine to alkane molar ratio and also upon the pressure employed in the reaction zone but should normally be above about 300° C. In general, the lower alkanes, e.g., methane and ethane have a somewhat higher initiation temperature than alkanes having carbon atoms, e.g., butanes. Temperatures above about 450° C. are preferred for reaction of methane and chlorine whereas temperatures above about 350° C. are preferred in the chlorination of ethane. When inhibitors such as oxygen are present in the reactants, even higher temperatures are necessary to obtain appreciable reaction.

In a continuous process, it is desired to maintain the temperature of the reaction sufficiently above the initiation temperature to prevent "chlorine breakthrough," i.e., the presence of unreacted chlorine in the reaction product. In general, the reaction zone temperature is usually maintained at at least 50° C. above the initiation temperature and preferably about 100° C. above initiation temperature for this purpose.

Several factors affect the chlorine breakthrough temperature, including the linear velocity of gases through the reaction zone, the degree of gas back-mixing in the reaction zone, the pressure of the reaction and the presence or absence of chlorination inhibitors. Also, when employing a fluidized bed reaction, the quantity of inert fluidized media also effects the chlorine-breakthrough temperature. In general, higher reactor velocities and the presence of inhibitors require higher temperatures to prevent chlorine breakthrough, e.g., from 25–50° C. higher when only 0.02 mole percent of oxygen is present in the feed gases. Conversely, the more back-mixing, such as by reactor baffles, and larger quantities of fluidized media, e.g., sand, when employing a fluidized reactor, permit generally lower reaction temperatures.

With regard to apparatus, as stated, some modifications, are also possible. For example, the throttling device can be a right conical shaped member or it may provide a right conical shapd portion and a base portion of cylindrical shape, as that described in the specification. It is also possible that the base portion and the right conical portion be separate members. The right conical section generally only provides for a space wherein the cross section can expand gradually and thereby prevent large pressure losses.

Having described the invention and the best mode of its operation what is claimed is:

1. Apparatus for mixing chlorine with a normally gaseous hydrocarbon at elevated temperature comprising two substantially coaxial tubular members each having gas inlet and gas outlet means, the first tubular member being projected within and terminating inside the second tubular member and having an open end adjacent to which is a throttling device having a base portion of substantially identical cross section to the cross section of said open end, the combination of said tubular base portion and said open end, forming gas outlet means consisting of a peripheral slot of adjustable width which opens perpendicularly into an annular space of constant area over the entire range of adjustability defined by the enclosing walls of the first and second tubular members and by the base portion of the throttling device, the said throttling device providing also a right conic section which extends into a frusto-conic opening formed by the converging walls of the second tubular member to form an annular frusto-conic opening, having an area which varies inversely with the width of said peripheral slot, the gas outlet means of the second tubular member being located upstream of the gas outlet means of the first tubular member, and having gas outlet means through the annular frusto-conic zone, said annular frusto-conic zone providing a gradient of uniformly increasing volume in a direction away from the annular space.

2. Apparatus for mixing chlorine with a normally gaseous hydrocarbon at elevated temperature comprising enclosing walls defining two substantially coaxial tubular members each having gas inlet and gas outlet means, the first tubular member being projected within and terminating inside the second tubular member and in rigid and fixed relationship therewith, the first tubular member having an open end adjacent to which is a throttling device having a base portion substantially identical in cross section with the cross section of said open end, the base portion of said throttling device being affixed to the second tubular member by means of an axially movable threaded shaft which permits axial movements of the base portion of said throttling device toward and away from said open end so as to form a peripheral slot of variable width opening perpendicularly into an annular space of constant area over the entire range of variability defined by the enclosing walls of the first and second tubular members and by the base portion of said throttling device, the said throttling device forming in addition to the base portion a right conic section which extends into a frusto-conic opening formed by the converging walls of the second tubular member to form an annular frusto-conic opening having an area which varies inversely with the width of said peripheral slot, the gas inlet means of the second tubular member being located upstream of the gas outlet means of the first tubular member, and having gas outlet means through the annular frusto-conic zone, said annular frusto-conic zone providing a gradient of uniformly increasing volume in a direction away from the annular space.

References Cited in the file of this patent

UNITED STATES PATENTS

| | | |
|---|---|---|
| 456,853 | Rollason | July 28, 1891 |
| 855,719 | Minto et al. | June 4, 1907 |
| 893,418 | Avery | July 14, 1908 |
| 1,437,649 | Guelbaum | Dec. 5, 1922 |
| 1,535,702 | Walsh | Apr. 28, 1925 |
| 3,047,368 | Marco | July 31, 1962 |
| 3,063,873 | Weinbrenner | Nov. 13, 1962 |